United States Patent
Tiberg

(10) Patent No.: US 8,504,258 B2
(45) Date of Patent: Aug. 6, 2013

(54) GPS ALTITUDE DATA FOR TRANSMISSION CONTROL SYSTEMS AND METHODS

(75) Inventor: Richard L. Tiberg, Milford, MI (US)

(73) Assignee: GM Global Technology Operations LLC

( * ) Notice: Subject to any disclaimer, the term of this patent is extended or adjusted under 35 U.S.C. 154(b) by 1300 days.

(21) Appl. No.: 11/561,506

(22) Filed: Nov. 20, 2006

(65) Prior Publication Data

US 2008/0119999 A1    May 22, 2008

(51) Int. Cl.
*G06F 7/00* (2006.01)
*G06F 17/00* (2006.01)
*G06F 19/00* (2011.01)

(52) U.S. Cl.
USPC .......................................................... 701/51

(58) Field of Classification Search
None
See application file for complete search history.

(56) References Cited

U.S. PATENT DOCUMENTS

| | | | | |
|---|---|---|---|---|
| 5,021,958 A * | 6/1991 | Tokoro | | 701/98 |
| 5,319,555 A * | 6/1994 | Iwaki et al. | | 701/57 |
| 5,598,336 A * | 1/1997 | Kume et al. | | 701/51 |
| 5,832,400 A * | 11/1998 | Takahashi et al. | | 701/53 |
| 6,042,505 A * | 3/2000 | Bellinger | | 477/111 |
| 6,625,535 B2 * | 9/2003 | Han et al. | | 701/65 |
| 7,359,784 B2 * | 4/2008 | Murasugi et al. | | 701/51 |
| 2002/0128775 A1 * | 9/2002 | Brodie et al. | | 701/216 |
| 2004/0249542 A1 * | 12/2004 | Murasugi et al. | | 701/51 |

* cited by examiner

*Primary Examiner* — Khoi Tran
*Assistant Examiner* — Nicholas Kiswanto

(57) ABSTRACT

A control system for controlling a transmission of a vehicle including a telematics system is provided. The system includes: a grade module that determines a current grade based on an altitude signal received from the telematics system; a force balance module that computes a vehicle mass based on a force balance equation and the current grade; and a transmission control module that controls the transmission based on the vehicle mass.

13 Claims, 3 Drawing Sheets

US 8,504,258 B2

GPS ALTITUDE DATA FOR TRANSMISSION CONTROL SYSTEMS AND METHODS

FIELD

The present disclosure relates to transmission control systems and more particularly to methods and systems for controlling a transmission based on altitude data from a telematics system.

BACKGROUND

The statements in this section merely provide background information related to the present disclosure and may not constitute prior art.

Vehicle manufacturers are now incorporating the use of a GPS receiver in their vehicles as part of an onboard communication between the vehicle and a central communication receiving location. The onboard communication system automatically locates the vehicle and provides the vehicle driver with assistance in a variety of circumstances. This type of information is typically provided to the driver for road side assistance or map direction purposes.

Telematics systems, such as ONSTAR® provided by General Motors, incorporate a GPS receiver that uses a satellite to provide real time information to the system. For instance, the GPS receiver determines the current longitude, latitude, and altitude of the vehicle. It would be advantageous for other control systems within the vehicle to make use of the data determined by the telematics systems.

SUMMARY

Accordingly, a control system for controlling a transmission of a vehicle including a telematics system is provided. The system includes: a grade module that determines a current grade based on an altitude signal received from the telematics system; a force balance module that computes a vehicle mass based on a force balance equation and the current grade; and a transmission control module that controls the transmission based on the vehicle mass.

In other features, a method of controlling a transmission is provided. The method includes: receiving an altitude signal generated by a telematics signal; computing at least one of a vehicle mass and an aerodynamic drag factor based on the altitude signal; and controlling the transmission based on the at least on of vehicle mass and aerodynamic drag factor.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
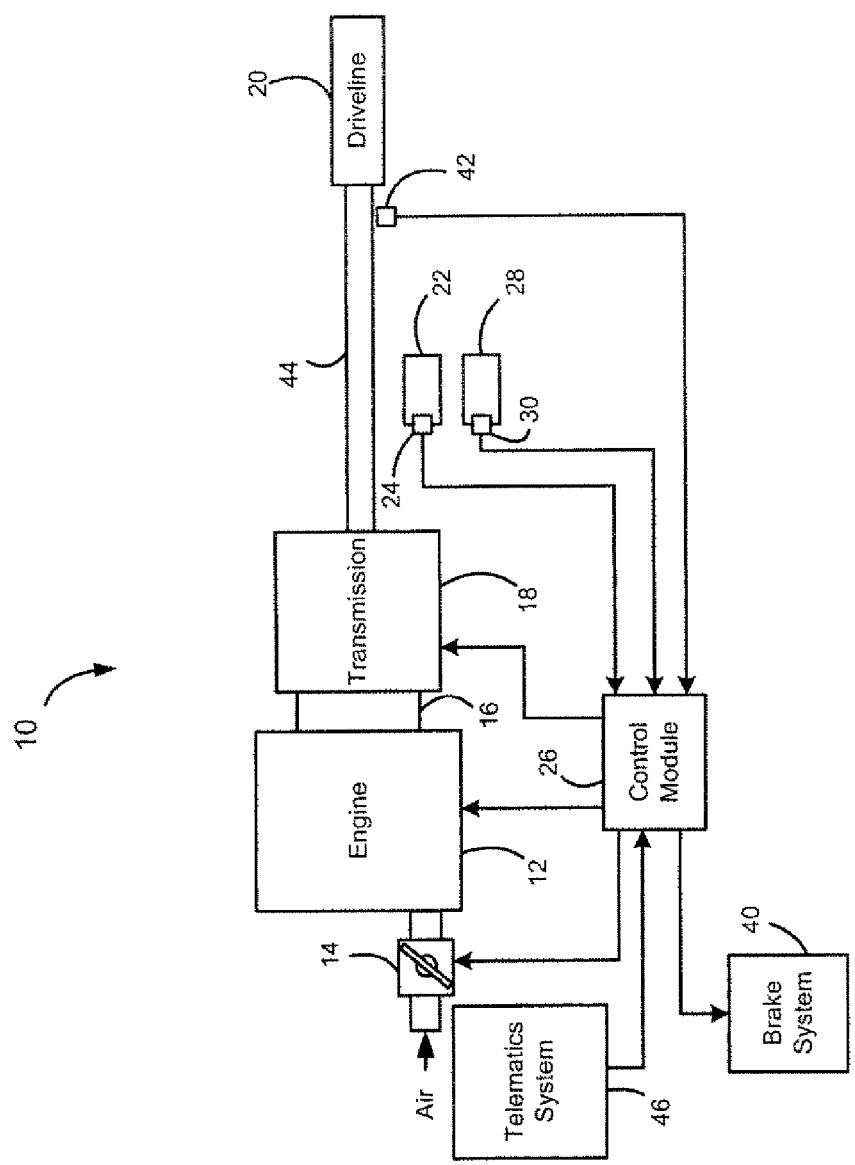
FIG. 1 is a functional block diagram of a vehicle including a telematics system.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle 10 includes an engine 12, that combusts an air and fuel mixture within cylinders (not shown) to produce drive torque. Air is drawn into the engine 12 through a throttle 14. A torque converter 16 transfers and multiplies torque from the engine 12 to a transmission 18. The transmission 18 operates in one or more gear ratios to transfer torque to a driveline 20.

An accelerator pedal 22 enables a driver of the vehicle 10 to adjust the position of the throttle 14 to achieve a desired speed. An accelerator pedal position sensor 24 generates a pedal signal indicating a position of the accelerator pedal 22. A control module 26 receives the pedal signal and adjusts the position of the throttle 14 accordingly. The control module 26 adjusts fuel delivery to the engine 12 based on the airflow. Similarly, a brake pedal 28 allows the driver to enable a brake system 40. The brake system 40 applies a braking torque to counter the drive torque. A brake pedal sensor 30 senses the position of the brake pedal 28 and generates a brake pedal signal accordingly. The control module 26 receives the signal and controls the brake system 40 of the vehicle 10. A vehicle speed sensor 42 generates a vehicle speed signal by sensing a rotational speed of at least one of a wheel (not shown) and a driveshaft 44. The control module 26 computes a vehicle speed from the vehicle speed signal and based on the position of the vehicle speed sensor 42.

The vehicle 10 is shown to include a telematics system 46. The telematics system is operable to facilitate communication between one or more satellites and the vehicle 10. An exemplary telematics system 46 may include General Motors' ONSTAR® system. The telematics system 46 includes a GPS receiver operable to determine a current altitude of the vehicle 10 and generate an altitude signal. The control module 26 receives the altitude signal and controls one or more vehicle components based on the altitude. In various embodiments, the control module 26 receives the altitude signal, computes at least one of vehicle mass, grade, and an aerodynamic drag factor, and controls the transmission based on the computed values. The more precise computed values allows the control module 26 to better control particular transmission functions such as powertrain braking, tow/haul, and neutral idle control.

Figure 2:
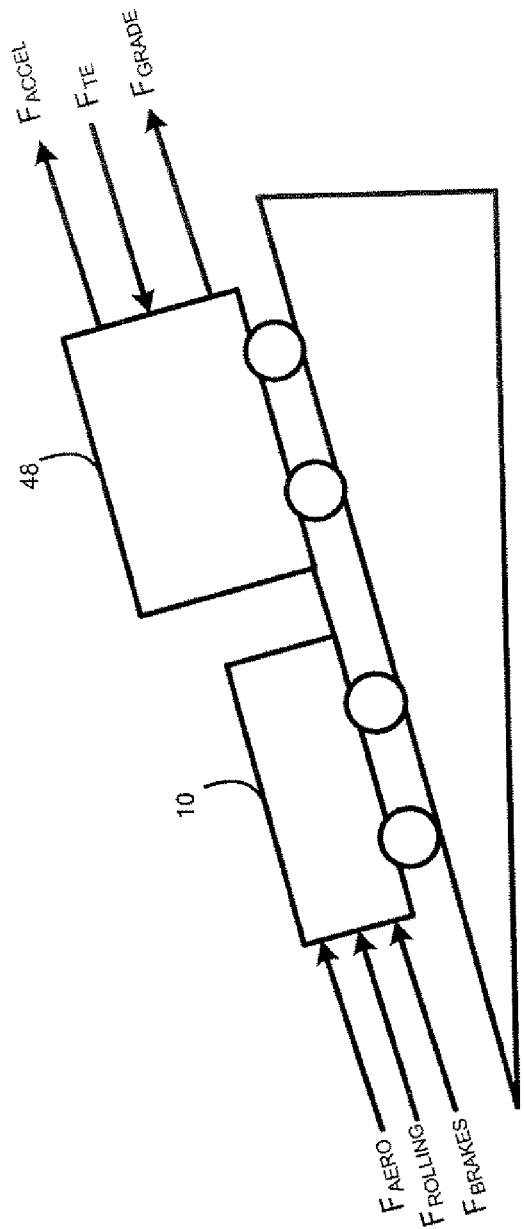
FIG. 2 is a diagram depicting forces acting on a vehicle.

Referring now to FIG. 2, a diagram illustrates potential forces that act on a vehicle 10 and trailer 48 while resting or traveling on a grade. From the altitude signal, a current grade can be computed. By incorporating the current grade into a force balance equation generated from the potential forces, actual values for various unknown parameters such as vehicle mass and an aerodynamic drag factor can be determined. The computed actual values will improve transmission control. For example, the tow/haul control can be enabled based on the actual vehicle mass. The neutral idle control can be enabled based on an accurate grade value. And the powertrain braking control can be enhanced based on the vehicle mass and actual grade.

With reference to FIG. 2, $F_{BRAKES}$ represents the braking force provided by the braking system 40 of FIG. 1. $F_{GRADE}$ represents the force due to gravity acting on the vehicle 10 and trailer 48 while on the grade. $F_{ACCEL}$ represents the force due to acceleration. $F_{ROLLING}$ represents the frictional force.

$F_{AERO}$ represents the aerodynamic force. $F_{TE}$ represents the tractive effort force. Balancing the forces provides:

$$F_{TE} - F_{AERO} - F_{ROLLING} - F_{ACCEL} - F_{GRADE} - F_{BRAKES} = 0. \quad (1)$$

The actual grade ($G_{ACTUAL}$) can be computed based on a change in altitude ($A_{CHANGE}$) and a distance traveled ($D_{TRAVELED}$) and provided:

$$G_{ACTUAL} = A_{CHANGE}/D_{TRAVELED}. \quad (2)$$

Based on the force balance equation (1) and the actual grade ($G_{ACTUAL}$), vehicle mass (M) can be determined as follows. For vehicle mass computations, the brake system 40 of FIG. 1 must not be applied. Thus, $F_{BRAKES}$ equals zero. $F_{AERO}$ is computed from an aerodynamic drag factor ($AD_{FACTOR}$) and vehicle speed (V) as shown as:

$$F_{AERO} = AD_{FACTOR} * V^2. \quad (3)$$

$AD_{FACTOR}$ can initially be set to a predetermined value. Thereafter $AD_{FACTOR}$ can be computed, as will be discussed in more detail below. $F_{GRADE}$ and $F_{ROLLING}$ are functions of vehicle mass (M) as shown as:

$$F_{GRADE} = M*(G*\mathrm{Sin}(G_{ACTUAL})); \text{ and} \quad (4)$$

$$F_{ROLLING} = R*M. \quad (5)$$

Where G represents a predetermined gravity constant and R represents a predetermined friction constant. $F_{TE}$ is computed based on an estimated engine torque 66, gear ratio 68, tire size 70, and torque converter status 72. Substituting in the above equations provides:

$$F_{TE} - F_{AERO} - R*M - M*(G*\mathrm{Sin}(G_{ACTUAL})) = M*A. \quad (6)$$

Solving for M provides:

$$M = (F_{TE} - F_{AERO})/(A + R + \mathrm{Sin}(G_{ACTUAL})*G). \quad (7)$$

This equation provides for a more accurate mass computation. A more accurate mass computation can enhance powertrain braking functionality and allow tow/haul mode to be automatically entered without requiring driver initiation.

Based on the force balance equation (1), the aerodynamic drag factor ($AD_{FACTOR}$) can be determined as follows. When the brake system 40 of FIG. 1 is not applied, $F_{BRAKES}$ equals zero. Thus providing:

$$F_{TE} - F_{AERO} - F_{ROLLING} - F_{ACCEL} - F_{GRADE} = 0. \quad (8)$$

Substituting mass (M) times acceleration (A) for $F_{ACCEL}$ provides:

$$F_{TE} - F_{AERO} - F_{ROLLING} - (M*A) - F_{GRADE} = 0. \quad (9)$$

M can initially be set to a predetermined value. Thereafter, M can be computed as discussed above. Solving for $F_{AERO}$ yields:

$$F_{AERO} = F_{TE} - F_{ROLLING} - (M*A) - F_{GRADE}. \quad (10)$$

$F_{TE}$, $F_{ROLLING}$, and $F_{GRADE}$ can be computed as described above. Provided equation (3) above $AD_{FACTOR}$ can be calculated as follows:

$$AD_{FACTOR} = F_{AERO}/V^2. \quad (11)$$

Thus, the $AD_{FACTOR}$ can be filtered and further refined as the mass calculation is updated to reflect the actual mass. The $AD_{FACTOR}$ is then used to compensate for changing aerodynamics of the vehicle 10 and trailer 48.

Figure 3:
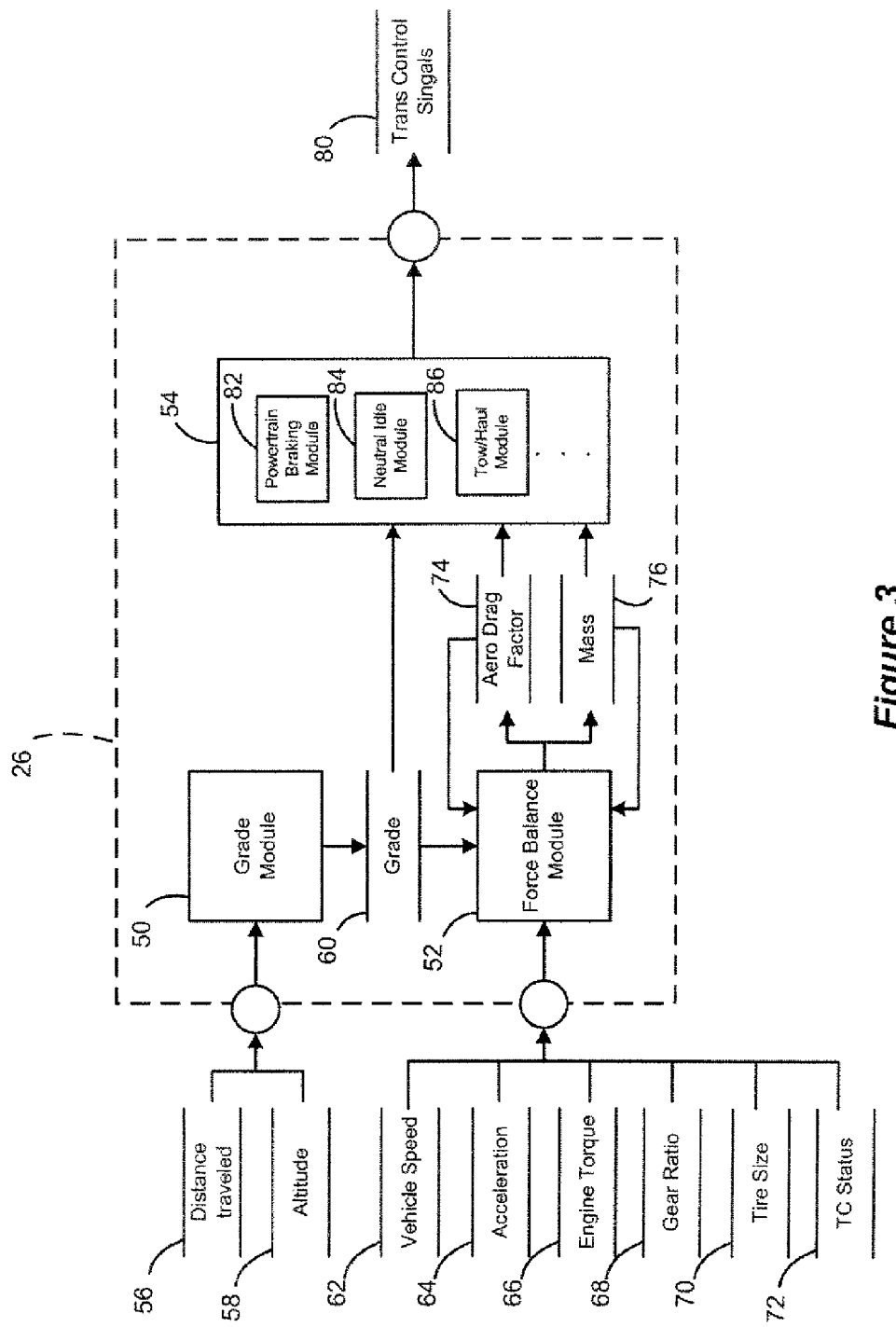
FIG. 3 is a dataflow diagram illustrating a transmission control system.

Referring now to FIG. 3, a dataflow diagram illustrates various embodiments of a transmission control system that may be embedded within the control module 26. Various embodiments of transmission control systems according to the present disclosure may include any number of sub-modules embedded within the control module 26. The sub-modules shown may be combined and/or further partitioned to similarly control functions of the transmission 18 based on the altitude signal. Inputs to the system may be sensed from the vehicle 10, received from other control modules (not shown) within the vehicle 10, and/or determined by other sub-modules (not shown) within the control module 26. In various embodiments, the control module 26 of FIG. 3 includes a grade module 50, a force balance module 52, and a transmission control module 54.

The grade module 50 receives as input distance traveled 56 and the altitude signal 58 received from the telematics system 46 of FIG. 1. The grade module computes a grade 60 based on equation (2) as discussed above. The force balance module 52 receives as input the grade 60, vehicle speed 62, acceleration 64, engine torque 66, gear ratio 68, tire size 70, and torque converter (TC) status 72. Based on the received inputs and the force balance equation (1), the force balance module computes a vehicle mass 76 and an aerodynamic drag factor 74 as discussed above. The aerodynamic drag factor 74 and vehicle mass 76 can be fed back into the force balance module 52 for use in subsequent computations.

The transmission control module 54 controls the transmission 18 of FIG. 1 via transmission control signals 80 based on the grade 60, the aerodynamic drag factor 74 and the vehicle mass 76. In various embodiments, the transmission control module 54 includes at least one of a powertrain braking module 82, a tow/haul module 84, and a neutral idle module 86. The powertrain braking module 82 controls the transmission 18 of FIG. 1 to provide a braking torque during powertrain braking conditions based on the vehicle mass 76. The neutral idle module 86 controls the transmission 18 of FIG. 1 to a geared neutral state during idle periods based on the vehicle mass 76 and the grade 60. The tow/haul module 84 controls shift patterns of the transmission 18 of FIG. 1 while towing various loads based on the vehicle mass 76.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control system for controlling a transmission of a vehicle including a telematics system, comprising:
   a grade module that determines a current grade based on an altitude signal received from the telematics system;
   a force balance module that computes a vehicle mass based on a force balance equation and the current grade; and
   a transmission control module that controls the transmission based on the vehicle mass.

2. The system of claim 1 wherein the force balance module computes an aerodynamic drag factor based on the current grade and a force balance equation.

3. The system of claim 2 wherein the force balance module initially computes the aerodynamic drag factor based on an initial predetermined vehicle mass value and thereafter based on the computed vehicle mass.

4. The system of claim 2 wherein the force balance module initially computes the vehicle mass based on an initial aerodynamic drag factor and thereafter based on the computed aerodynamic drag factor.

5. The system of claim 2 wherein the force balance module computes at least one of the vehicle mass and the aerodynamic drag factor based on at least one of a braking force, a gravitational force, an acceleration force, a frictional force, a tractive effort force, and an aerodynamic force wherein the gravitational force is based on the current grade.

6. The system of claim 1 wherein the force balance module computes the vehicle mass (M) based on tractive effort force ($F_{TE}$), aerodynamic force ($F_{AERO}$), acceleration (A), a friction constant (R), the current grade ($G_{ACTUAL}$), and a gravity constant (G).

7. The system of claim 6 wherein the force balance module computes the vehicle mass (M) based on the following equation:

$$M=(F_{TE}-F_{AERO})/(A+R+\mathrm{Sin}(G_{ACTUAL})*G).$$

8. The system of claim 2 wherein the force balance module computes the aerodynamic drag factor ($AD_{FACTOR}$) based on tractive effort force ($F_{TE}$), frictional force ($F_{ROLLING}$), vehicle mass (M), acceleration (A), gravitational force ($F_{GRADE}$), and velocity (V).

9. The system of claim 8 wherein the force balance module computes the aerodynamic drag factor ($AD_{FACTOR}$) based on the following equation:

$$AD_{FACTOR}=F_{TE}-F_{ROLLING}-(M*A)-F_{GRADE}/V^2.$$

10. The system of claim 1 wherein the transmission control module includes a tow/haul sub-module that controls shift patterns of the transmission based on the vehicle mass.

11. The system of claim 1 wherein the transmission control module includes a powertrain braking sub-module that controls a powertrain braking function of the transmission based on the vehicle mass.

12. The system of claim 1 wherein the transmission control module includes neutral idle sub-module that controls a neutral idle state of the transmission based on the current grade and the vehicle mass.

13. The system of claim 1 wherein the grade module computes the grade based on a change in the altitude signal over a time period and a distance traveled over the time period.

* * * * *